United States Patent [19]
Stewart

[11] Patent Number: 5,357,847
[45] Date of Patent: Oct. 25, 1994

[54] PRESSURE VESSELS HAVING END CLOSURES AND RETAINERS

[75] Inventor: Duncan R. Stewart, Newent, England

[73] Assignee: Hytork Actuators Limited, Gloucester, England

[21] Appl. No.: 686,438

[22] Filed: Apr. 17, 1991

[51] Int. Cl.⁵ .............................. F01B 29/00
[52] U.S. Cl. ........................ 92/128; 92/163; 92/169.1; 92/170.1; 92/136; 403/375; 220/319
[58] Field of Search ............ 92/163, 128, 165 R, 92/169.1, 170.1; 403/308.1, 375; 220/319; 411/112, 537, 539

[56] References Cited

U.S. PATENT DOCUMENTS

| | | | |
|---|---|---|---|
| 2,436,407 | 2/1948 | Stephens | 220/319 |
| 2,616,587 | 11/1952 | Petch | 220/319 |
| 2,749,162 | 6/1956 | Humphrey | 220/319 |
| 2,839,218 | 6/1958 | Zerbe . | |
| 2,890,917 | 6/1959 | Prince | 92/169.1 |
| 3,136,230 | 6/1964 | Buckley | 220/319 |
| 3,418,888 | 12/1968 | Mercier | 92/258 |
| 3,437,230 | 4/1969 | Savory . | |
| 3,494,652 | 2/1970 | Langland . | |
| 3,811,401 | 5/1975 | Bimba | 411/316 |
| 3,986,635 | 10/1976 | Niskin . | |
| 4,192,225 | 3/1980 | Moyer | 92/169.1 |
| 4,496,071 | 1/1985 | Stewart | 220/319 |

FOREIGN PATENT DOCUMENTS

| | | |
|---|---|---|
| 0029118 | 5/1981 | European Pat. Off. . |
| 0204650 | 1/1988 | European Pat. Off. . |
| 853093 | 11/1960 | United Kingdom . |
| 2123517 | 2/1984 | United Kingdom . |

Primary Examiner—Thomas E. Denion
Attorney, Agent, or Firm—William R. Hinds

[57] ABSTRACT

A fluid-pressure operated actuator has a body and an end cap which when telescoped in the body provides confronting grooves which receive a circlip in the form of a flexible length of wire spring. The end cap carries an O-ring seal axially only outwards of the circlip. Relative rotation between the body and end cap draws the circlip into position. A threaded plug, which may be secured to the outer end of the circlip, sealingly connects the body and end cap and may permit relative axial and angular movement.

11 Claims, 3 Drawing Sheets

PRESSURE VESSELS HAVING END CLOSURES AND RETAINERS

This invention relates to pressure vessels.

Many pressure vessels consist of a hollow cylinder to which end caps are fitted. The end cap may be connected to the cylinder by a circlip. One example is in British Patent specification 2123517 or U.S. patent specification No. 4,496,071 in which the end cap carries two O-ring seals on axially opposite sides of a peripheral groove. When tim end cap is assembled to the cylinder, the groove confronts a groove in the cylinder and a flexible circlip is inserted into the passage defined by the grooves through a passage in the end cap which is sealed by a threaded plug. The axially inner O-ring acts as a pressure seal. Although such an arrangement is satisfactory, the present invention seeks to provide an improvement.

Other arrangements are shown in U.S. patent specification Nos. 3,494,652, 3,986,635 which has a locking device axially outwardly of a seal; 3437230; 2839218; 2952480.

According to one aspect of this invention a pressure vessel comprises a hollow member, an end closure tn telescope relationship with the hollow member, flexible continuous means extending around the end closure and operatively connecting the closure and the hollow member, a passage in the hollow member for insertion and withdrawal of the flexible continuous means, an annular pressure seal between the closure and the hollow member, the continuous means at its outer end being secured to a threaded plug sealingly receivable in a bore in the passage.

According to another aspect of this invention a pressure vessel comprises a hollow member, an end closure in telescopic relationship with the hollow member flexible continuous means extending around the end closure and operatively connecting the closure and the hollow member, a passage in the hollow member for insertion and withdrawal of the flexible continuous means an annular pressure seal between the closure and the hollow member only axially outwards of and between the continuous means and the environment external of the hollow member.

There may be a threaded member received in the passage and threadedly connected to the closure, and seal means between the threaded member and the hollow member for sealing the passage, said passage being shaped to permit relative axial movement between the threaded member and the hollow member.

The passage may be shaped to permit also relative angular movement between the threaded member and the hollow member.

The passage may define a radially outwardly facing surface, said seal means being engaged between said surface and a head on the threaded member.

The flexible continuous means may at its outer end be secured to a threaded plug sealingly receivable in an aperture In the hollow member.

The invention may be performed in various ways and two specific embodiments with possible modifications will now be described by way of example with reference to the accompanying drawings, in which.

Figure 1:
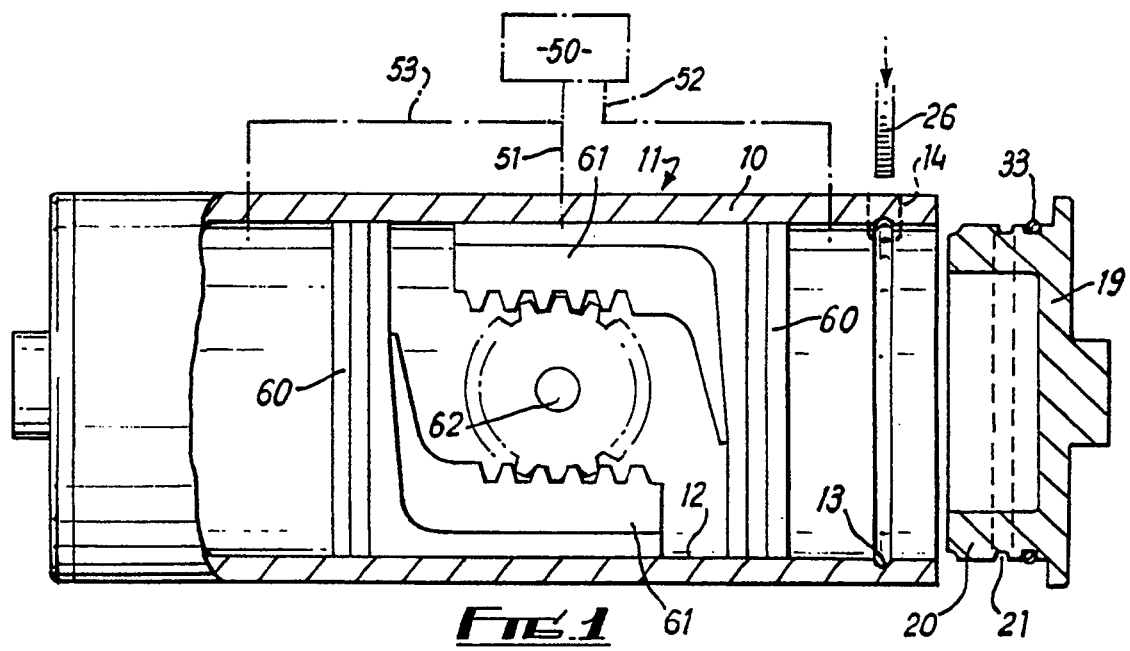
FIG. 1 is an axial section through a pressure vessel.

Referring to the drawings, a wall 10 of a hollow pressure vessel or cylinder 11 has an inner annular groove 13 of semi-circular cross-section towards the end of its bore 12. A passage 14 leading into the groove 13 is formed in the wall 10. An end cap or end fitting 19 has an axial extension 20 of an external diameter which is close fit when telescoped in the bore 12. A further semi-circular cross-section annular groove 21 is provided on the external surface of the extension 20 of the same dimensions as the groove 13 so that on assembly of the end cap to the cylinder the grooves are aligned to provide a substantially circular section annular groove 22. A flexible member in the form of a circlip 26, for example a length of close-coiled wire spring cut to an appropriate length, is inserted into the groove 22.

Figure 2:
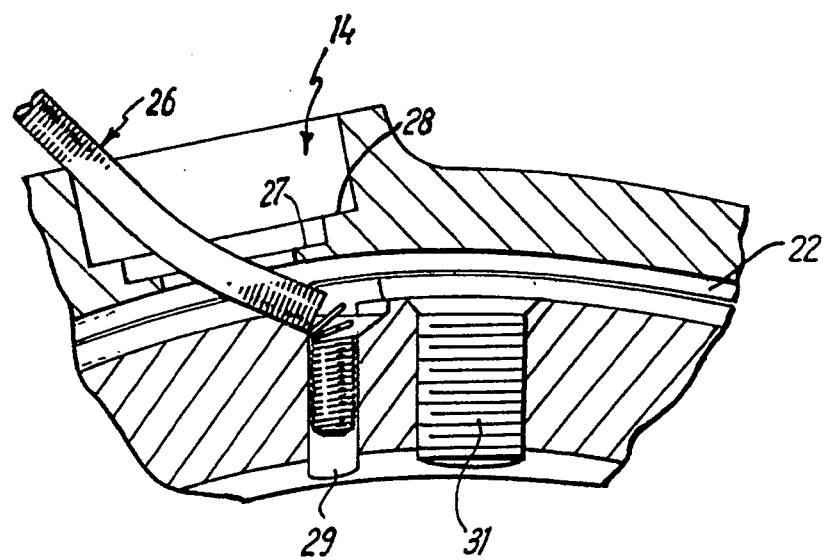
FIG. 2 is a scrap view showing end cap and cylinder in one relative position.
Figure 3:
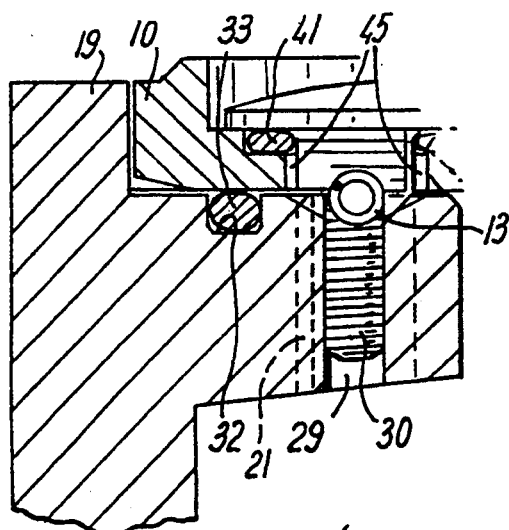
FIG. 3 is a side view of FIG. 2.

As shown in FIG. 2, the passage 14 has a stepped bore providing radially outwardly facing annular shoulders 27, 28. The end cap 19 has a radial bore 29 FIG. 3 for receiving the inner end 30 of the flexible continuous circlip 26 and an angularly spaced internally threaded radial passage 31 FIG. 2 in the same transverse plane.

Axially outwardly of the groove 21 is a peripheral groove 32 receiving an O-ring seal 33 which acts both as a pressure seal to prevent escape of internal pressure and as a seal which prevents the possibly noxious or corrosive exterior atmosphere reaching the circlip and interior of the vessel.

Figure 4:
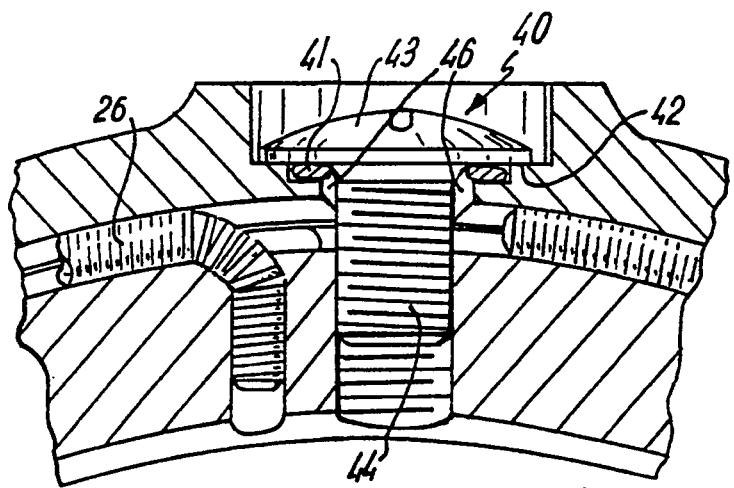
FIG. 4 is a view showing the cap and cylinder in another position.

To assemble the vessel, the end cap with O-ring 33 is inserted into the end of the cylinder with the passage 14 angularly aligned with the bore 29. Tile inner end of the circlip 26 is inserted into the bore 29 and the end cap is then rotated relative to the body 10 to draw the circlip 26 into the groove 22 until the passage 14 is radially aligned with the passage 31 (FIG. 4).

A threaded bolt 40 is then screwed into the passage 31. An O-ring seal 41 is engaged between the shoulder 27 and tile flat underface 42 of the head 43 of the bolt 40 to prevent ingress of the external atmosphere to the groove 22.

Because the internal pressure acts on the flexible circlip 26 there may be relative axial movement between the body 10 and tile end cap 19. The stem 44 of the bolt 40 has an axial clearance 45 FIG. 3 in the passage 14 to permit such movement and avoid undue strain on the bolt. There is also an angular clearance 46 FIG. 4. Preferably the bolt head 43 is wholly received in the passage 14 and the head 43 may have an external formation requiring a special tool to rotate the bolt.

Figure 5:
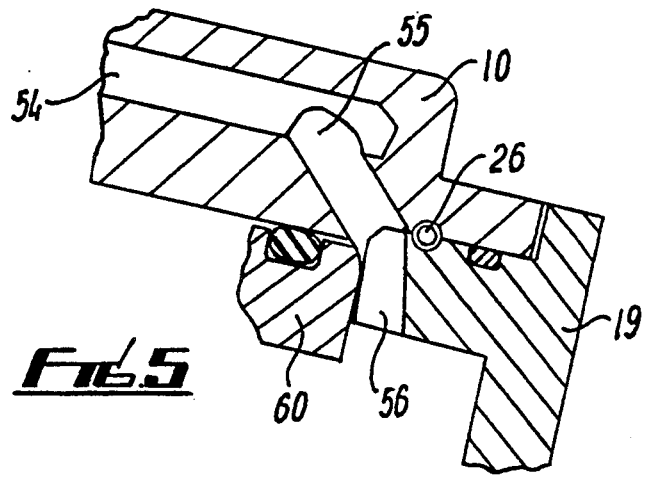
FIG. 5 is a scrap view showing end cap and piston in one position.

In some cases the pressure vessel may be in the form of an actuator including opposed pistons 60 with axial racks 61 engaging a pinion on a shaft 62 extending to the exterior of the body 10 for operating a valve for example. A control unit 50 may alternately supply compressed air to the interior of the body 10 between the pistons 60 through line 51 and to the interior of the body 10 axially outwardly of the pistons on lines 52, 53 thus to reciprocate the pistons and oscillate the shaft 62. In such a case the line 53 may be in the wall 10 in the form of a passage 54 FIG. 5 communicating with the interior of the vessel by passage 55 in the wall 10 and a cut-out 56 in the extension 20 (piston 60 shown in an end position). It is important to keep the passages 55 and cut-outs 56 in radial alignment and this is achieved by bolt stem 44 engaging in passage 31, the clearance 46 being insufficient to permit loss of communication between the passage 55 and the cut-out 56.

Such an arrangement with a pressure seal 33 axially outwards of the circlip 26 enables a simpler end cap with reduced components, the bolt 40 permits axial floating of the end cap within acceptable limits whilst maintaining adequate sealing and gives radial alignment of the end cap within acceptable limits.

The end cap may be formed with two cut-outs 56 angularly spaced so that the same design of end cap can be used at both ends of the vessel.

Figure 6:
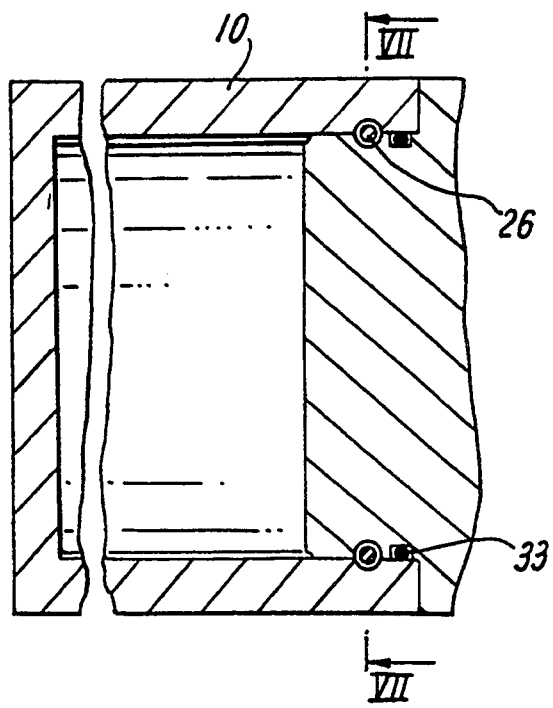
FIG. 6 is a section of another arrangement.
Figure 7:
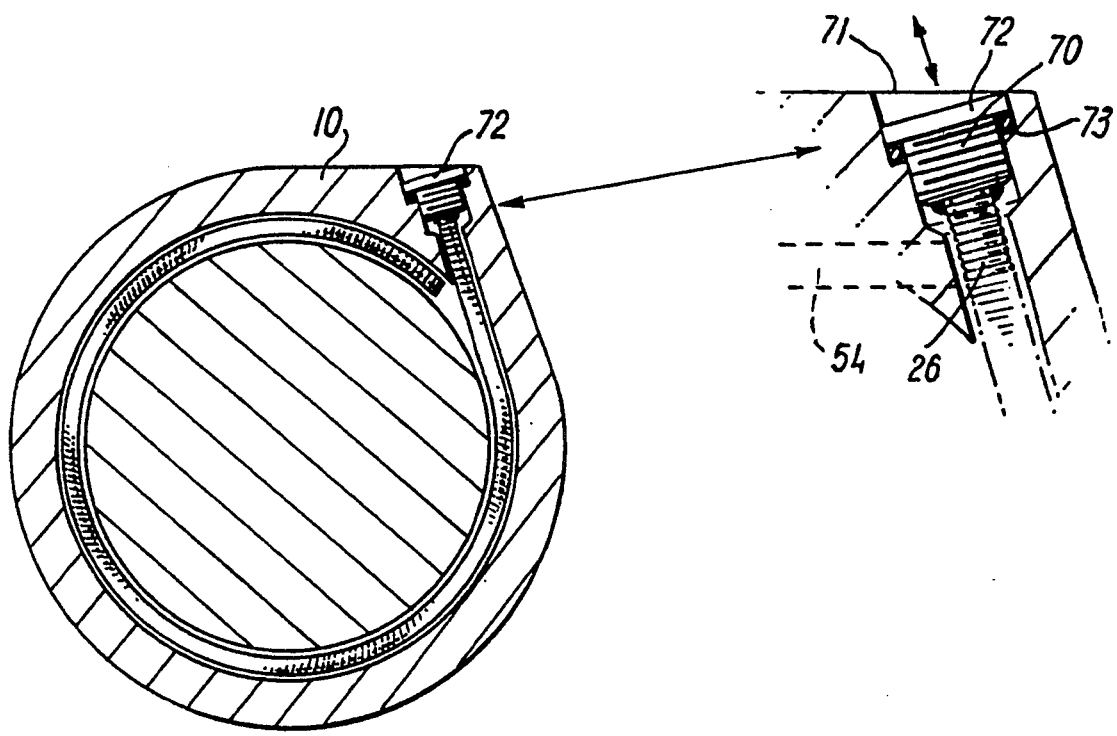
FIG. 7 is a section on the line 7—7 of FIG. 6.

In another arrangement shown in FIGS. 6 & 7 the flexible means, circlip 26, may at its outer end be secured to a threaded plug 70 receivable in a threaded bore 75 of a stepped bore 71 in the hollow member wall 10 which bore is tangential to the peripheral groove 22. This affords means of direct access for the flexible member into the peripheral groove. The plug has an enlarged head 72 which engages an O-ring seal 73 abutting shoulder 76.

The flexible member rotates with the threaded plug on assembly and disassembly but locks the plug against inadvertent removal when pressure is applied to the interior of the pressure vessel.

The threaded plug 70 is sealed against internal pressure and also affords protection against external environments.

The threaded bore 75 may be made to intersect the passage 54 so that the intersection lies below the threaded plug. Compressed air may then feed into the interior of the vessel through the bore 71 into the peripheral groove and via clearances provided between the body 10 and the closure 19 into the cylinder 10.

The coils of the circlip allow free passage of air.

This arrangement provides a visual confirmation that the circlip is in position.

I claim:

1. A pressure vessel comprising a hollow member, an end closure in telescope relationship with the hollow member, flexible continuous means extending around the end closure and operatively connecting the closure and the hollow member, a passage in the hollow member for insertion and withdrawal of the flexible continuous means, an annular pressure seal between the closure and the hollow member, the continuous means at its outer end being secured to a threaded plug sealingly receivable in a bore in the passage.

2. A pressure vessel as claimed in claim 1, in which the annular pressure seal is only axially outwards of the continuous means and between the continuous means and the environment external of the vessel.

3. A pressure vessel as claimed in claim 1, in which the continuous means is located in cooperating grooves in the hollow member and the closure.

4. A pressure vessel as claimed in claim 1, in which the plug has a head engaging a seal to seal the passage.

5. A pressure vessel as claimed in claim 1, in which the passage communicates with a passage in the hollow member for admission of compressed air to the interior of the hollow member.

6. A pressure vessel as claimed in claim 1, in the form of a valve actuator comprising reciprocable pistons in the hollow member co-operable with an output shaft extending to the exterior of the hollow member.

7. A pressure vessel comprising a hollow member, an end closure in telescope relationship with the hollow member, flexible continuous means extending around the end closure and operatively connecting the closure and the hollow member, a passage in the hollow member for insertion and withdrawal of the flexible continuous means, an annular pressure seal between the closure and the hollow member only axially outwards of the continuous means and between the continuous means and the environment external of the hollow member, a threaded member received in the passage and threadedly connected to the closure, and seal means between the threaded member and the hollow member for sealing the passage, said passage being shaped to permit relative axial movement between the threaded member and the hollow member.

8. A pressure vessel as claimed in claim 7, in which the passage is shaped to permit also relative angular movement between the threaded member and the hollow member.

9. A pressure vessel as claimed in claim 7, in which the passage defines a radially outwardly facing surface, said seal means being engaged between said surface and a head on the threaded member.

10. A pressure vessel as claimed in claim 7, in which the flexible continuous means at its outer end is secured to a threaded plug sealingly receivable in an aperture in the hollow member.

11. A pressure vessel comprising a hollow member, an end closure in telescope relationship with the hollow member, flexible continuous means extending around the end closure and operatively connecting the closure and the hollow member, a passage in the hollow member for insertion and withdrawal of the flexible continuous means, an annular pressure seal between the closure and the hollow member only axially outwards of the continuous means and between the continuous means and the environment external of the hollow member, which the passage communicates with a passage in the hollow member for admission of compressed air to the interior of the hollow member.

* * * * *